(12) United States Patent
Delin et al.

(10) Patent No.: US 11,579,006 B2
(45) Date of Patent: Feb. 14, 2023

(54) RADAR LEVEL GAUGE AND METHOD FOR DETECTING A CLEANING PROCESS USING THE RADAR LEVEL GAUGE

(71) Applicant: Rosemount Tank Radar AB, Mölnlycke (SE)

(72) Inventors: Håkan Delin, Linköping (SE); Pär Abrahamsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 0 days.

(21) Appl. No.: 17/476,826

(22) Filed: Sep. 16, 2021

(65) Prior Publication Data
US 2022/0107217 A1  Apr. 7, 2022

(30) Foreign Application Priority Data
Oct. 6, 2020 (EP) .................................... 20200224

(51) Int. Cl.
*G01F 23/28* (2006.01)
*G01F 23/284* (2006.01)
*G01S 13/88* (2006.01)

(52) U.S. Cl.
CPC .......... *G01F 23/2845* (2013.01); *G01S 13/88* (2013.01)

(58) Field of Classification Search
CPC ................. G01F 23/2845; G01S 13/88
See application file for complete search history.

(56) References Cited

U.S. PATENT DOCUMENTS 6,917,326 B1 * 7/2005 Tregenza ............. G01F 23/284
  73/290 R
7,284,425 B2 * 10/2007 Wennerberg .......... G01F 23/284
  73/290 V (Continued)

FOREIGN PATENT DOCUMENTS

CN         108947008 A  * 12/2018  ................ C02F 9/00
DE    10 2018 102 610       6/2019

(Continued)

OTHER PUBLICATIONS

Extended European Search Report from European Patent Application No. 20200224.2, dated Mar. 24, 2021.

*Primary Examiner* — John Fitzgerald
(74) *Attorney, Agent, or Firm* — Westman, Champlin & Koehler, P.A.

(57) ABSTRACT

Method and system for detecting a cleaning process in a radar level gauge configured to determine a fill level of a product contained in a tank, the radar level gauge comprising a transceiver configured to provide a transmit signal, $S_T$, to be propagated towards the product by a propagating device, to receive a reflected signal, $S_R$, resulting from a reflection of the transmit signal at a surface of the product, and to determine a fill level in the tank based on the received reflected signal, wherein the method comprises: at a measurement position above the fill level and a known distance from a reference position near a ceiling of the tank, determining a difference in signal amplitude between at least two different fill level measurements; and if the determined difference in signal amplitude exceeds a predetermined threshold value, determining that a cleaning process is ongoing in the tank.

15 Claims, 5 Drawing Sheets

(56) References Cited

U.S. PATENT DOCUMENTS

| | | | |
|---|---|---|---|
| 7,551,122 B1* | 6/2009 | Delin | G01F 23/284 342/91 |
| 8,612,057 B2* | 12/2013 | Murata | E03C 1/05 700/282 |
| 8,872,696 B2* | 10/2014 | Wenger | G01S 13/10 73/290 R |
| 10,746,585 B2* | 8/2020 | Delin | G01F 23/284 |
| 2006/0137446 A1* | 6/2006 | Wennerberg | G01F 23/284 73/290 V |
| 2009/0146867 A1* | 6/2009 | Delin | G01F 25/20 342/124 |
| 2013/0069817 A1* | 3/2013 | Wenger | G01F 23/284 342/124 |
| 2014/0332032 A1 | 11/2014 | Lenk | |
| 2016/0097671 A1 | 4/2016 | Faber et al. | |
| 2019/0101431 A1* | 4/2019 | Delin | G01S 13/88 |

FOREIGN PATENT DOCUMENTS

| | | | | |
|---|---|---|---|---|
| EP | 3 199 971 | | 8/2017 | |
| FR | 2943414 A1 * | | 9/2010 | G01F 23/2962 |
| JP | 8-197027 | | 8/1996 | |
| JP | 4307365 | | 8/2009 | |

* cited by examiner

RADAR LEVEL GAUGE AND METHOD FOR DETECTING A CLEANING PROCESS USING THE RADAR LEVEL GAUGE

CROSS-REFERENCE TO RELATED APPLICATION

This application claims priority to European Patent Application No. 20200224.2, filed Oct. 6, 2020, the content of which is hereby incorporated by reference in its entirety.

FIELD OF THE INVENTION

The present invention relates to a radar level gauge and to a method for detecting a cleaning process by the guided wave radar level gauge. In particular, the present invention is aimed at detecting and determining properties of a cleaning process in a tank using the radar level gauge.

BACKGROUND OF THE INVENTION

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank.

The transmitted electromagnetic signals are reflected at the surface of the product, and the reflected signals are received by a receiver or transceiver comprised in the radar level gauge. Based on the transmitted and reflected signals, the distance to the surface of the product can be determined. More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

In some applications, tank cleaning is an important part of the production cycle. This may for example be true for food production or in chemical processes. During cleaning of the tank, the fill level determination may be difficult or impossible to perform due to disturbances related to the cleaning process. In view of this, it is desirable to provide a solution for handling a cleaning process in a radar level gauge.

SUMMARY

In view of above-mentioned problems, it is an object of the present invention to provide a method and system for determining if a cleaning process is taking place in the tank.

According to a first aspect of the invention, there is provided a method for detecting a cleaning process in a radar level gauge configured to determine a fill level of a product contained in a tank. The radar level gauge comprises a transceiver configured to provide a transmit signal, Tx-signal to be propagated towards the product by a propagating device, to receive a reflected signal resulting from a reflection of the transmit signal at a surface of the product, and to determine a fill level in the tank based on the received reflected signal. The method comprises: for a given distance from a reference position near a ceiling of the tank, determining a difference in signal amplitude between at least two consecutive fill level measurements; and if the determined difference in signal amplitude exceeds a predetermined threshold value, determining that a cleaning process is ongoing in the tank.

The tank may be any container or vessel capable of containing a product, and may be metallic, or partly or completely non-metallic, open, semi-open, or closed.

The "transceiver" may be one functional unit capable of transmitting and receiving electromagnetic signals or it may be a system comprising separate transmitter and receiver units.

Moreover, the propagating device may be an antenna in a free radiating radar level gauge system, but it may also be a probe in a guided wave radar (GWR) application.

The present invention is based on the realization that a cleaning process in a tank can be detected by observing a change in amplitude of the received signal corresponding to a position above the fill level. A cleaning process can for example be performed by means of a spray ball located close to the ceiling of the tank, where the spray ball comprises one or more nozzles spraying water and/or other cleaning agents towards the inner surfaces of the tank. This means that there will be a turbulent ambience in the tank which can be detected by observing the amplitude of the signal for a known measurement position. Thereby, if an operator initiates a cleaning process, or if a cleaning process is automatically initiated, the radar level gauge can provide a verification that the cleaning process actually started. Moreover, it can also be detected if a cleaning process is initiated, either by an operator or as a system controlled function, and then fails to start or does not start when expected.

Cleaning is commonly performed in an empty or nearly empty tank. However, a cleaning process may also be performed in a tank comprising a product, in which case the measurement position is above a fill level. If it is determined that a cleaning process is ongoing in the tank having a product therein, this can be notified to an operator or it can be handled by automatically compensating the fill level measurement as long as the cleaning process is ongoing as will be described in further detail in the following.

According to one embodiment of the invention, determining a difference in signal amplitude comprises determining a relative difference in signal amplitude. Thereby, the detected change in signal amplitude is not dependent on if the amplitude is increasing or decreasing form one measurement to another. The difference in signal amplitude can be seen as a measure of the signal fluctuations in the tank at the measurement position or in the tank as a whole, where a high fluctuation, i.e. a fluctuation above a threshold value, is seen as indicative of an ongoing cleaning process.

According to one embodiment of the invention, the method further comprises: providing the transmit signal in the form of a frequency sweep signal; and sampling the received reflected signal at predetermined intervals, wherein each sample corresponds to a unique distance from the reference position. The frequency sweep signal may for example be a frequency modulated continuous wave signal (FMCW) commonly used in radar level gauge systems. Each sample of the FMCW-signal correspond to a known distance from the reference position. Accordingly, by sampling the received signal at regular intervals, the amplitude of the signal can be derived for the corresponding different distances at regular intervals from the reference position. For a free radiating antenna, the reference position may be at the antenna itself, i.e. at the position where the antenna emits the signal into the tank. By using the described frequency sweep signal, it is possible to compare the signal amplitude with the predetermined threshold value for multiple positions between the antenna and the surface of the product, thereby improving the reliability of the determination that a cleaning process is ongoing.

According to one embodiment of the invention, determining a difference in signal amplitude comprises: determining a relative difference in signal amplitude for a plurality of different samples of a frequency sweep signal; determining a median value of the determined differences in signal amplitude; and comparing the median value with a predetermined threshold value. Each sample corresponds to a unique distance from the reference position, and each sweep can be seen as representing a point in time, and by performing the comparison with the threshold value using the median value of the difference in signal amplitude for a single sweep, the influence of outlier values and echoes not resulting from a cleaning process can be reduced.

According to one embodiment of the invention, determining a difference in signal amplitude comprises: determining a relative difference in signal amplitude for a plurality of different samples of a frequency sweep signal; determining a median value of the difference in signal amplitude for the frequency sweep signal; determining a change in median value compared to at least one median value of an earlier frequency sweep signal; and if the change in median value is higher than a predetermined threshold value, determining that a cleaning process is ongoing in the tank. In the described embodiment, the difference in signal amplitude is compared to a difference in signal amplitude from a previous frequency sweep signal, thereby further increasing the reliability in the determination that a cleaning process is ongoing. Since the cleaning process is expected to introduce fluctuations in the difference in signal amplitude, also the median value can be expected to fluctuate between different frequency sweeps. It is further possible to compare the median value over more than two frequency sweeps, and a condition that a cleaning process is ongoing may for example be that the median value should be above the threshold value for a predetermined number of consecutive frequency sweeps.

According to one embodiment of the invention, determining a difference in signal amplitude comprises: determining a relative difference in signal amplitude for a plurality of different samples of a plurality of frequency sweep signals; determining a median value of the relative difference in signal amplitude for each frequency sweep signal; determining a change in median value compared to at least one median value of an earlier frequency sweep signal; and if the change in median value is higher than a predetermined threshold value, determining that a cleaning process is ongoing in the tank. Accordingly, the relative difference in signal in signal amplitude must not be compared to a specific threshold value. Instead, the change in a median value of the relative difference in signal amplitude is observed.

According to one embodiment of the invention, the method further comprises: determining a background difference value based on samples corresponding to a first range of distances from the reference position; determining a near zone difference value based on samples corresponding to a second range of distances from the reference position, wherein the second range is a subrange of the first range, the subrange starting at an endpoint of the first range corresponding to a position closest to the reference position; and determining that a cleaning process is ongoing if at least one of the background difference value and the near zone difference value is above a corresponding background and near zone threshold value.

The background zone can be seen as a zone extending from the reference position and into the tank towards the surface of the product of the tank, or to the bottom of the tank if the tank is empty, and the near zone is a zone closest to the antenna, also starting from the reference location. The precise extension of the background zone and the near zone can be determined for each specific application based on a range of parameters such as antenna and signal properties, antenna type, tank size etc. In general, the background zone can be seen as a zone where no echoes are expected, i.e. neither surface echoes nor echoes from other objects in the tank. The background zone thereby gives a measure of the variation in signal amplitude arising from the cleaning process. The near zone can be seen as a region closest to the antenna and as a zone where a cleaning process can be expected to influence the properties of the antenna as such, such as the transition of the transmit signal from an emitting antenna to the tank ambience.

According to one embodiment of the invention, the method may further comprise: determining that a cleaning process is ongoing only if both the background difference value and the near zone difference value is above the corresponding threshold values. It can thereby be further ensured that a detected difference in signal amplitude is the result of a cleaning process and not the result of other events in the tank.

According to one embodiment of the invention, the method may further comprise: if it is determined that a cleaning process is ongoing, comparing a difference in signal amplitude for the current cleaning process with a signal amplitude difference acquired at an earlier cleaning process; and if a change of difference in signal amplitude is above a threshold value, providing a notification that the properties of the cleaning process have changed. Thereby it is possible to not only detect that a cleaning process is ongoing but also to monitor the quality of the cleaning process. In particular, it may be possible to detect if the cleaning is degraded since fluctuations occurring during a cleaning process can be expected to be the same for repeated cleaning processes, at least as long as other conditions in the tank are similar. It also possible to compare a determined difference in signal amplitude for a recent cleaning process with a reference difference value acquired when the tank is new and empty or under other controlled conditions where it can be verified that the cleaning process is operating at full capacity.

Moreover, by observing the properties of the cleaning process for both the near zone and the background zone, it can be estimated if the whole tank is being properly cleaned or if there are specific regions where the cleaning process is degraded. It would also be possible to divide the tank into even more zones and to observe the properties of the cleaning process for each zone separately.

According to one embodiment of the invention, the method further comprises, if it is detected that a cleaning process is ongoing in the tank, reducing a sensitivity of a fill level measurement. Alternatively, or in combination, the method may comprise discarding fill level measurements acquired during the cleaning process. Since the cleaning process introduces disturbances in the tank, it may be advantageous to reduce the sensitivity of the level measurements being performed during the cleaning process to reduce the risk that artefacts resulting from the cleaning process are interpreted as surface echoes. Furthermore, in some applications it may be desirable to entirely discard measurements performed during the cleaning process. However, a measurement signal may still be emitted so that measurements can be resumed once it is detected that the cleaning process has finished.

According to a second aspect of the invention, there is provided a radar level gauge configured to determine a fill level of a product contained in a tank. The radar level gauge comprises: a transceiver configured to provide a transmit signal, Tx-signal to be propagated towards the product by a propagating device, to receive a reflected signal resulting from a reflection of the transmit signal at a surface of the product, and to determine a fill level in the tank based on the received reflected signal. The radar level gauge further comprises measurement control circuitry configured to: at a measurement position above the fill level and a known distance from a reference position near a ceiling of the tank, determine a difference in signal amplitude between at least two consecutive fill level measurements; and if the determined difference in signal amplitude exceeds a predetermined threshold value, determine that a cleaning process is ongoing in the tank.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a radar level gauge installed in a tank located on land. However, the described system and method is suitable for use in other areas such as in marine applications. Moreover, various embodiments of the present invention are mainly discussed with reference to a free radiating radar level gauge system with a signal propagation device in the form of an antenna emitting and receiving the measurement signal. However, various embodiments of the invention are equally applicable for a guided wave radar system comprising a probe along which the signal is propagating.

Figure 1:
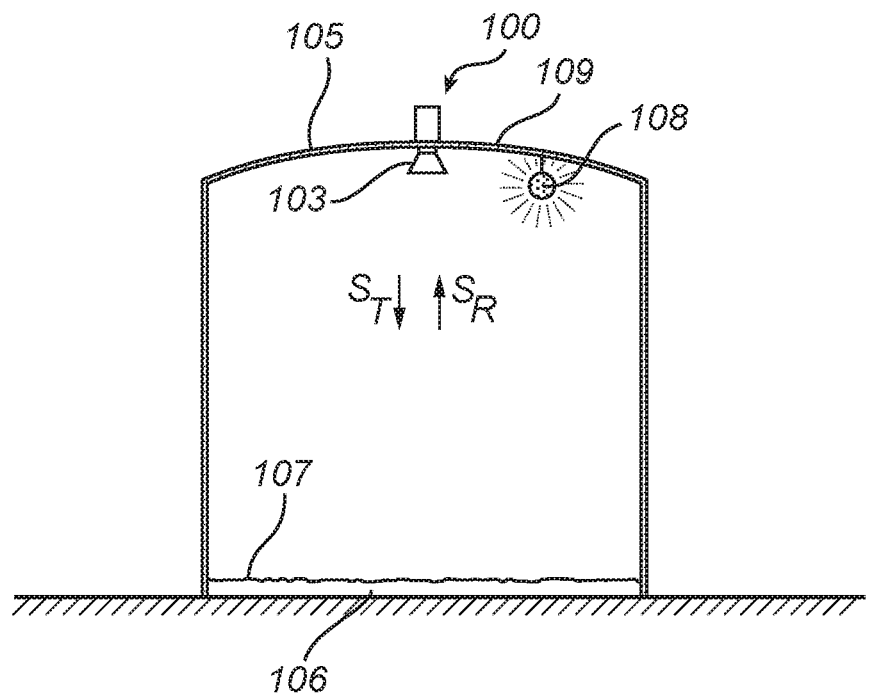
FIG. 1 schematically illustrates an exemplary tank arrangement comprising a radar level gauge system according to an embodiment of the present invention.

FIG. 1 schematically illustrates a radar level gauge system 100 comprising a measurement unit 102 and a signal propagation device, here shown in the form of a horn antenna 103. It should, however, be noted that the signal propagation device may equally well be another type of radiating antenna, or a transmission line probe. The radar level gauge system 100 is arranged on top of a tank 105 for determining the filling level of a product 106 in the tank 105.

When measuring the filling level of the product 106 in the tank 105, the radar level gauge system 100 transmits an electromagnetic transmit signal $S_T$ by the horn antenna 103 towards the surface 107 of the product 106, where the signal is reflected as an electromagnetic surface echo signal $S_R$. The distance to the surface 107 of the product 106 is then determined based on the travel time of the electromagnetic surface echo signal $S_R$ (from the radar level gauge system 100 to the surface 107 and back). From the travel time, the distance to the surface, generally referred to as ullage, can be determined. Based on this distance (the ullage) and known dimensions of the tank 105, the filling level can be deduced.

Using the radar level gauge system according to various embodiments of the present invention, the travel time is determined based on the frequency difference between the frequency-modulated transmit signal and the surface reflection signal. This type of measurement scheme is often referred to as FMCW (Frequency Modulated Continuous Wave), and a measurement signal can be described as a signal sweep having limited and known duration.

FIG. 1 further illustrates a cleaning arrangement in the form of a spray ball 108 located at or near the top of the tank 105. In the illustrated example the spray ball is hanging from the ceiling 109 of the tank 105. The spray ball 108 is arranged to clean the tank 105 by providing a flow of e.g. water through a plurality of openings in the ball. Other types of cleaning arrangements are also feasible, and the cleaning arrangement does not have to be stationary and fixed to the tank. In principle, the claimed invention is capable of detecting any type of cleaning which influences the tank environment in the vicinity of the antenna or propagation device.

Figure 2:
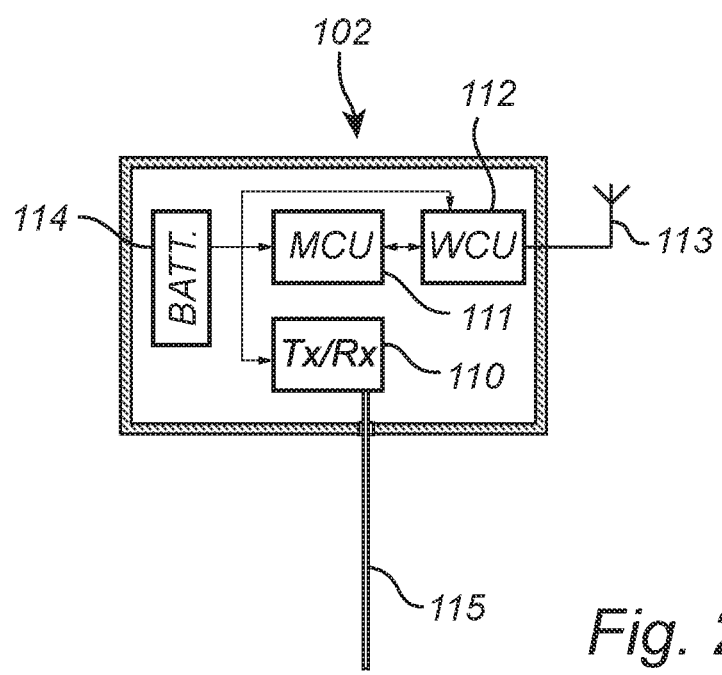
FIG. 2 is schematic illustration of a measurement unit comprised in the radar level gauge system in FIG. 1.

Referring to the schematic block diagram in FIG. 2, the measurement unit 102 of the radar level gauge system 100 in FIG. 1 comprises a transceiver 110, a measurement control unit (MCU) 111, a wireless communication control unit (WCU) 112, a communication antenna 113, an energy store, such as a battery 114, and a tank feed-through 115.

As is schematically illustrated in FIG. 2, the MCU 111 controls the transceiver 110 to generate, transmit and receive electromagnetic signals. The transmitted signals pass through the tank feed-through 115 to the horn antenna 103 (not shown in FIG. 2), and the received signals pass from the horn antenna 103 through the tank feed-through 115 to the transceiver 110.

As was briefly described above with reference to FIG. 1, the MCU 111 determines the filling level of the product 106 in the tank 105 based on the phase difference between the transmit signal $S_T$ and the surface echo signal $S_R$. The filling level is provided to an external device, such as a control center from the MCU 111 via the WCU 112 through the communication antenna 113. The radar level gauge system 100 may advantageously be configured according to the so-called WirelessHART communication protocol (IEC 62591).

Although the measurement unit 102 is shown to comprise an energy store 114 and to comprise devices (such as the WCU 112 and the communication antenna 113) for allowing wireless communication, it should be understood that power supply and communication may be provided in a different way, such as through communication lines (for example 4-20 mA lines, HART), in which case the WCU 112 may be replaced by a control unit for wired communication.

Figure 3:
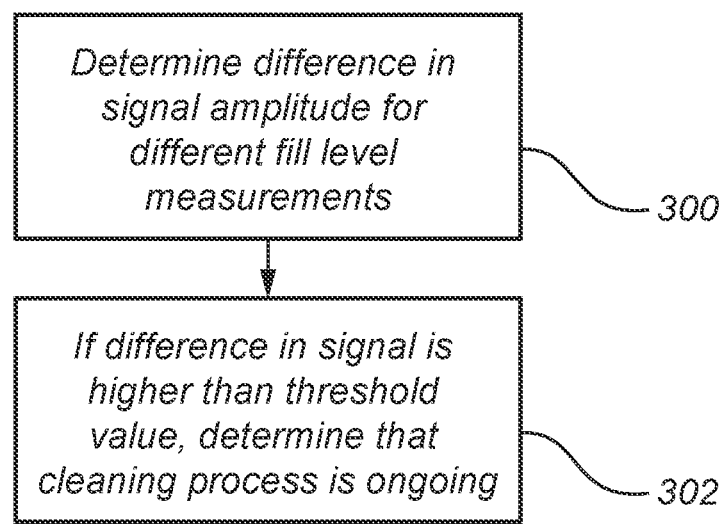
FIG. 3 is a is a flow chart outlining the general steps of a method according to an embodiment of the invention.
Figure 4:
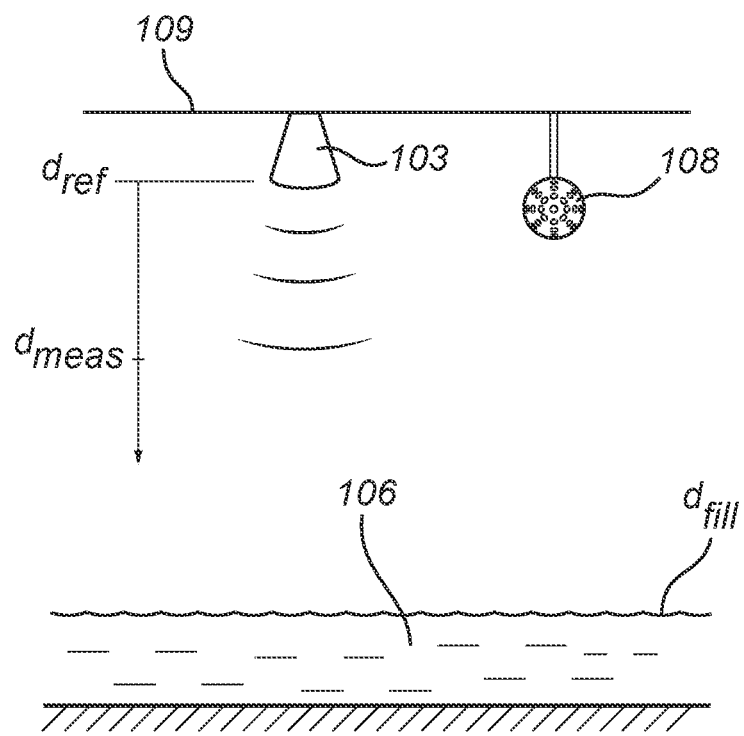
FIG. 4 is schematic illustration of a portion of a tank illustrating features of the invention.

FIG. 3 is a flow chart outlining steps of a method according to an embodiment of the invention, and the method will be described with further reference to FIG. 4 illustrating the tank 105 where the horn antenna 103 is located.

The method comprises determining 300 a difference in signal amplitude between at least two different fill level measurements at a measurement position $d_{meas}$ which is above the fill level $d_{fill}$ and which is at a known distance from a reference position $d_{ref}$ near a ceiling 109 of the tank. The reference position may for example be set as the position nearest the antenna where it is possible to detect a reflected signal, and the reference position can then be seen to describe the transition from the antenna to the ambience. It should be noted that it is not explicitly required to know where the position of the fill level for performing the described method for determining if a cleaning process is ongoing. The method can thus be performed using a fixed measurement position $d_{meas}$.

Figure 5:
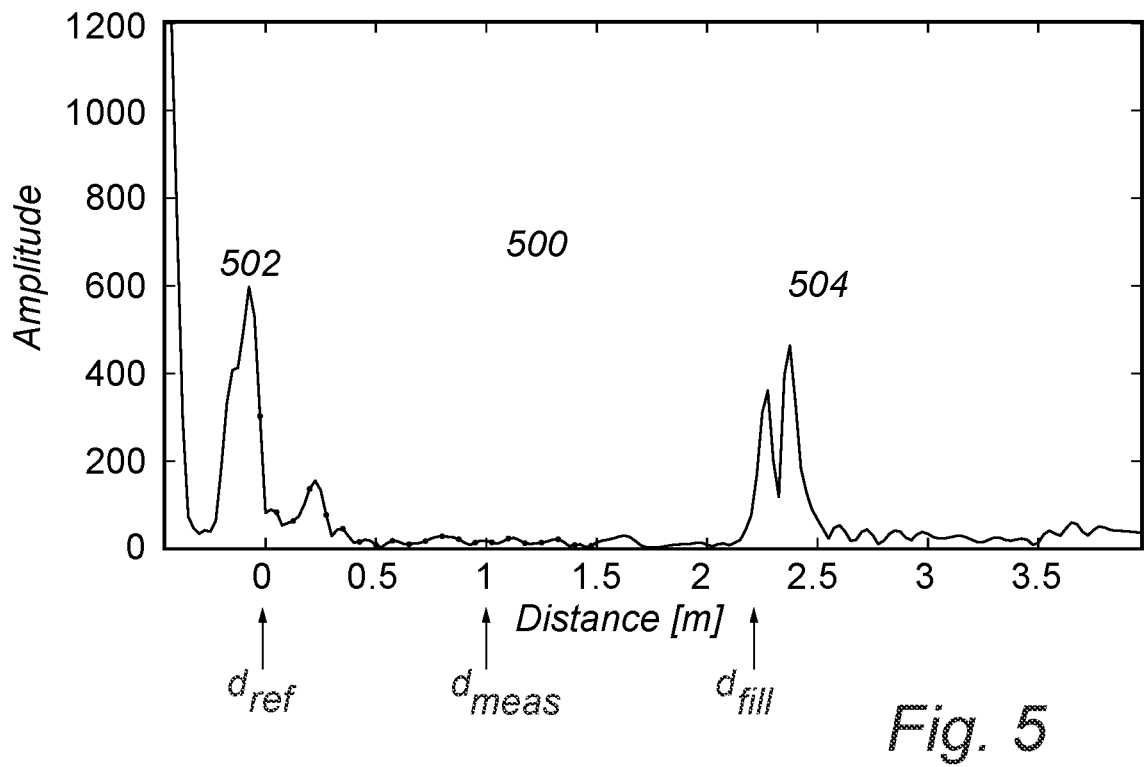
FIG. 5 is a graph schematically outlining a signal used in an embodiment of the invention.

FIG. 5 schematically illustrates the signal amplitude of a received measurement signal where zero on the x-axis corresponds to the reference position $d_{ref}$. The large echo 502 located before zero-point originates from the transition from the antenna to the ambience and is thus disregarded. The second larger echo 504 located at a distance from the antenna correspond to the fill level. $d_{fill}$, and the measurement position $d_{meas}$ is thus selected to be located between $d_{ref}$ and $d_{fill}$. The points on the curve of FIG. 5 represent sample points at different distances where the signal amplitude may be determined.

Accordingly, the amplitude at a selected measurement position is determined for two different measurements, i.e. for two different signal sweeps. The two measurements to compare may for example be consecutive measurements. The duration of a signal sweep and the repetition frequency of signal sweeps may vary greatly depending on the type of radar level gauge and on the application at hand. In an exemplary embodiment a duration of signal sweep may be in the range of 100 μs-100 ms and the repetition frequency is typically on the order of 1-5 Hz but may also be outside of said range. However, FMCW measurements are well known to the skilled person and will not be discussed in further details herein.

The method further comprises determining 302 that a cleaning process is ongoing in the tank if the determined difference in signal amplitude exceeds a predetermined threshold value. A large difference in signal amplitude between two measurements which are relatively close in time is indicative of a turbulent ambience at the measurement location, which is typical for a cleaning process where water splashes around the antenna and/or in the tank as a whole. The difference in signal amplitude is advantageously determined as a relative difference such that a sign or absolute amplitude does not influence the difference value. Relative difference=$|A_{S1}-A_{S2}|/MIN(A_{S1}, A_{S2})$ where $A_{S1}$ and $A_{S2}$ are two separate signal amplitudes derived from different measurements. Thereby, a positive scalar value representing the relative change in signal amplitude is determined, which can be compared to a predetermined threshold value.

Accordingly, if the determined difference in signal amplitude exceeds the predetermined threshold value, it can be determined that a cleaning process is ongoing in the tank. The threshold value can for example be preset by characterizing signal amplitude fluctuations for a cleaning process under controlled conditions.

As can be seen in FIG. 5, a number of sample points are illustrated where each sample point corresponds to a known distance from the reference position. The distance resolution between sample points in an example system may be in the range of 1-5 cm.

For a radar level gauge where the transmit signal is provided in the form of a frequency sweep signal, the received reflected signal can thus be sampled at predetermined intervals, wherein each sample corresponds to a unique distance from the reference position. Determining a difference in signal amplitude may then comprise determining a relative difference in signal amplitude for a plurality of different samples of a frequency sweep signal, determining a median value of the determined differences in signal amplitude; and comparing the median value with a predetermined threshold value, and if the median value exceeds the threshold value, determining that a cleaning process is ongoing in the tank.

Figure 6:
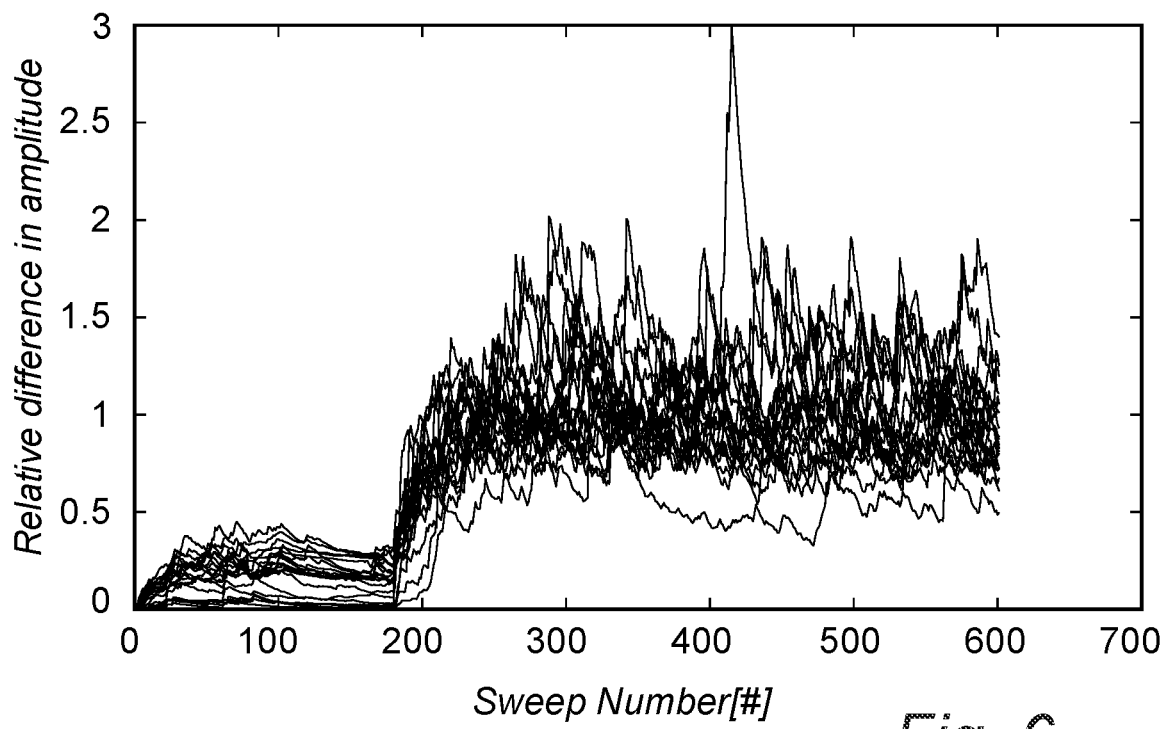
FIG. 6 is a graph schematically outlining curves derived by a method according to an embodiment of the invention.
Figure 7:
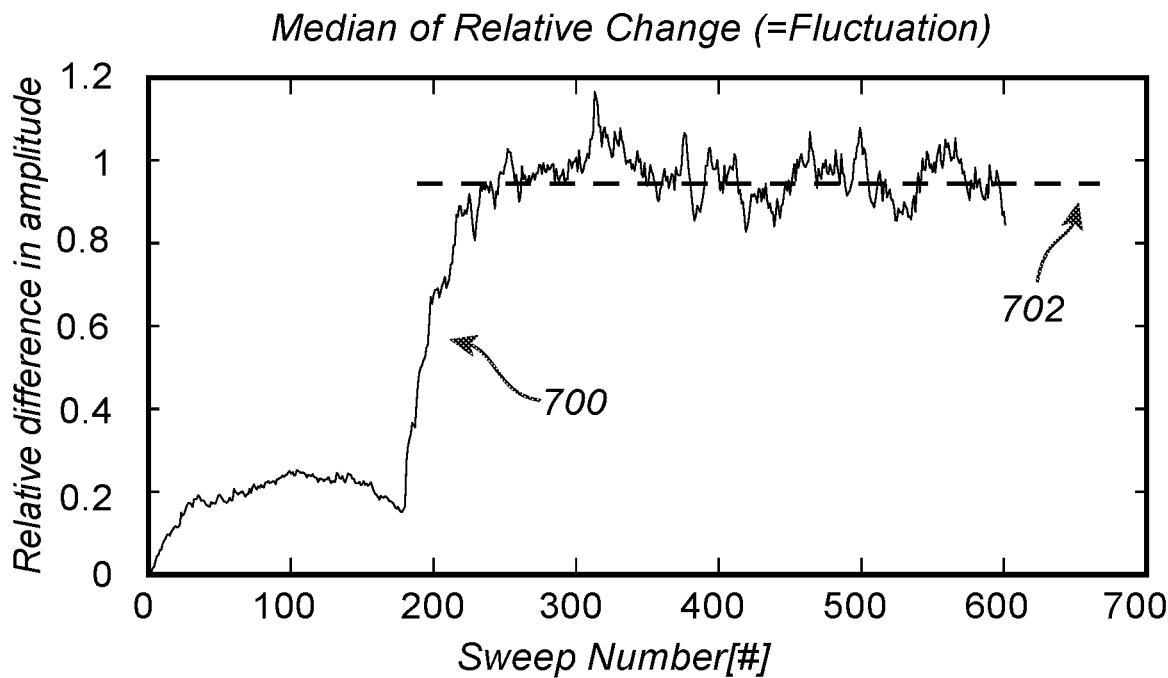
FIG. 7 is a graph schematically outlining a curve derived by a method according to an embodiment of the invention.

FIG. 6 illustrates a plurality of curves where each curve corresponds to a specific distance from the reference position, and where the x-axis represents the sweep number which is proportional to time. It can be assumed that all the illustrated measurement sweeps were performed with a fixed interval. Based on the information illustrated in FIG. 6, a median value of the relative difference can be determined for each signal sweep, i.e. in practice for each point in time. The median value is thus taken as a median of the values along a vertical line intersecting all of the curves, thereby being the median value of the signal variation of all the sample points/distances for a single signal sweep. Thereby, the influence of outlier values can be avoided. The acquired median values for the signal sweeps are illustrated in FIG. 7. The curve 700 of FIG. 7 can thus be sees as describing the fluctuation of the signal amplitude as a function of time. At approximately sweep number 180, a notable increase in fluctuation (i.e. difference in signal amplitude) can be seen and this can be taken as an indication that a cleaning process has begun. In the previous examples, it has been described that the difference in signal amplitude has been compared to a threshold value. However, when observing FIG. 7 it is immediately clear that other parameters can be used to determine that a cleaning process is starting in the tank. It is for example possible to study the derivative of the curve or to look at a moving average of the values. Other signal processing methods for detecting and characterizing a change are also feasible and are well within the scope of the present invention. For example, low-pass filtering may be employed on the difference curves to reduce noise, and the change in difference value can also be derived as a change in standard deviation.

Based on e.g. the curve 700 of FIG. 7, it is also possible to characterize the cleaning process as such. By observing an average absolute value of the relative difference in amplitude, schematically represented by the line 702 in FIG. 7, it can for example be determined if the quality of the cleaning process is degraded. A lower average value is indicative of lower fluctuation, which may be a result of a degraded cleaning process. Causes for a degradation of the cleaning process may be that the openings of the spray ball are being clogged or that the pressure of fluid to the spray ball is reduced. By comparing information derived from the curve of FIG. 7 with one or more corresponding curves from one or more earlier cleaning process, it can also be determined if a degradation in the cleaning process is gradual or abrupt, which in turn may provide guidance as to the cause of the degradation.

Figure 8:
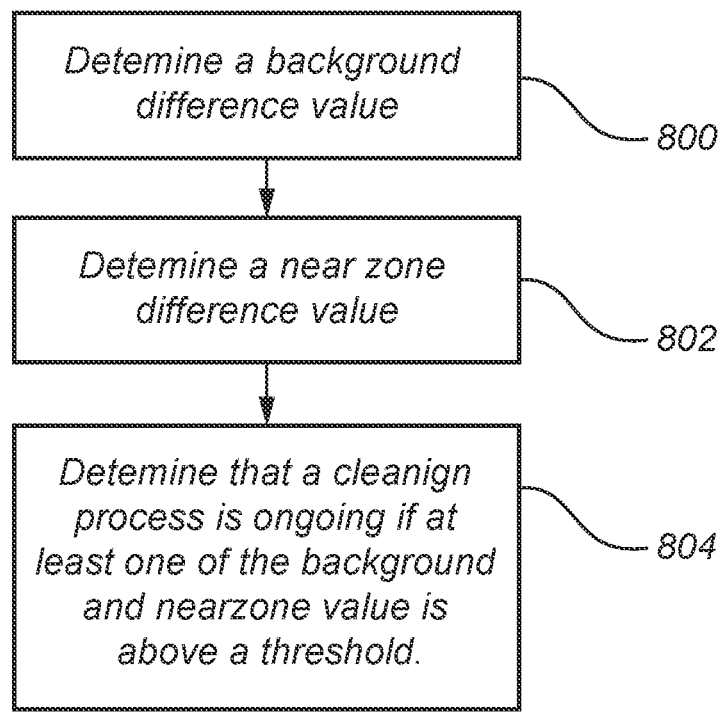
FIG. 8 is a is a flow chart outlining the general steps of a method according to an embodiment of the invention.

According to one embodiment of the invention illustrated by the flowchart of FIG. 8, the method may comprise: determining 800 a background difference value based on samples corresponding to a first range 900 of distances from the reference position; determining 804 a near zone difference value based on samples corresponding to a second range 902 of distances from the reference position, wherein the second range is a subrange of the first range, the subrange starting at an endpoint of the first range corresponding to a position closest to the reference position; and determining 804 that a cleaning process is ongoing if at least one of the background difference value and the near zone difference value is above a corresponding background and near zone threshold value.

Figure 9:
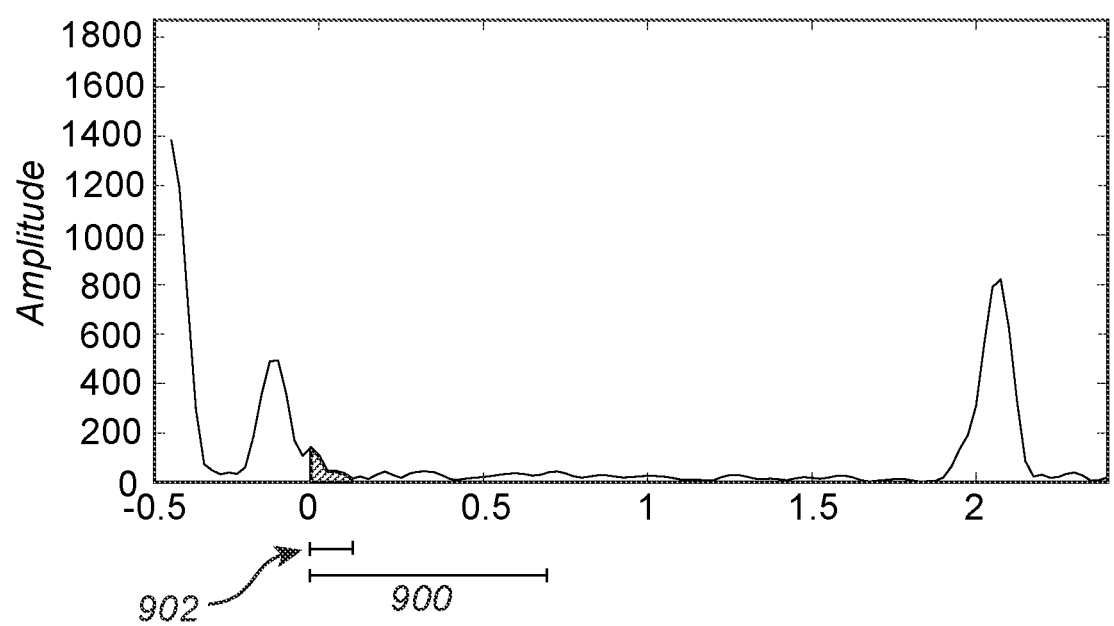
FIG. 9 is a graph schematically outlining features of the invention.

As illustrated in FIG. 9, the second range 902 is a subrange of the first range 900, where the subrange starts at an endpoint of the first range 900 corresponding to a position closest to the reference position. The first and second ranges 900, 902 may also be non-overlapping. The near zone difference value characterizes the behaviour closest to the antenna and the background difference value can be seen as representing the environment between the antenna and the fill level. Accordingly, the condition may be set that at least one or both of the near zone difference value and the background difference value should exceed a corresponding threshold value or exhibit a sufficient change over time for it to be determined that a cleaning process is ongoing.

The result of determining that a cleaning process is ongoing may be to reduce the sensitivity of the level measurement, to discard measurement values, or to pause the level measurement. In the same manner as described above, it can also be determined that a cleaning processes is completed and that normal operating conditions can be resumed. Moreover, other parameters of the cleaning process can be determined and evaluated, such as duration and performance over time. Accordingly, a cleaning process can be performed and detected without changing or pausing the level measurement, and it may be possible to acquire accurate level measurement also during a cleaning process.

Various embodiments of the described invention can be used for tanks in the food industry, for beverages, in chemical, pharmaceutical or other processes, in marine applications, for oil, gas, liquid natural gas etc.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for detecting a cleaning process in a radar level gauge configured to determine a fill level of a product contained in a tank, the radar level gauge comprising a transceiver configured to provide a transmit signal, $S_T$, to be propagated towards the product by a propagating device, to receive a reflected signal, $S_R$, resulting from a reflection of the transmit signal at a surface of the product, and to determine a fill level in the tank based on the received reflected signal, wherein the method comprises:

at a measurement position above the fill level and a known distance from a reference position near a ceiling of the tank, determining a difference in signal amplitude between at least two different fill level measurements; and if the determined difference in signal amplitude exceeds a predetermined threshold value, determining that a cleaning process is ongoing in the tank.

2. The method according to claim 1, wherein determining a difference in signal amplitude comprises determining a relative difference in signal amplitude.

3. The method according to claim 1, further comprising:
   if it is determined that a cleaning process is ongoing, comparing a difference in signal amplitude for the current cleaning process with a signal amplitude difference acquired at an earlier cleaning process; and
   if a change of difference in signal amplitude is above a threshold value, providing a notification that the properties of the cleaning process have changed.

4. The method according to claim 1, further comprising, if it is detected that a cleaning process is ongoing in the tank, reducing a sensitivity of a fill level measurement or discarding fill level measurements acquired during the cleaning process.

5. The method according to claim 1, further comprising:
   providing the transmit signal in the form of a frequency sweep signal; and
   sampling the received reflected signal at predetermined intervals, wherein each sample corresponds to a unique distance from the reference position.

6. The method according to claim 5, wherein determining a difference in signal amplitude comprises:
   determining a relative difference in signal amplitude for a plurality of different samples of a frequency sweep signal;
   determining a median value of the determined differences in signal amplitude; and
   comparing the median value with a predetermined threshold value, and if the median value exceeds the threshold value, determining that a cleaning process is ongoing in the tank.

7. The method according to claim 5, wherein determining a difference in signal amplitude comprises:
   determining a relative difference in signal amplitude for a plurality of different samples of a frequency sweep signal;
   determining a median value of the difference in signal amplitude for the frequency sweep signal;
   determining a change in median value compared to at least one median value of an earlier frequency sweep signal; and
   if the change in median value is higher than a predetermined threshold value, determining that a cleaning process is ongoing in the tank.

8. The method according to claim 5, wherein determining a difference in signal amplitude comprises:
   determining a relative difference in signal amplitude for a plurality of different samples of a plurality of frequency sweep signals;
   determining a median value of the relative difference in signal amplitude for each frequency sweep signal;
   determining a change in median value compared to at least one median value of an earlier frequency sweep signal; and
   if the change in median value is higher than a predetermined threshold value, determining that a cleaning process is ongoing in the tank.

9. The method according to claim 5, further comprising:
   determining a background difference value based on samples corresponding to a first range of distances from the reference position;
   determining a near zone difference value based on samples corresponding to a second range of distances from the reference position; and
   determining that a cleaning process is ongoing if at least one of the background difference value and the near zone difference value is above a corresponding background and near zone threshold value.

10. The method according to claim 9, further comprising:
    determining that a cleaning process is ongoing only if both the background difference value and the near zone difference value is above the corresponding threshold values.

11. A radar level gauge configured to determine a fill level of a product contained in a tank, the radar level gauge comprising:
    a transceiver configured to provide a transmit signal, $S_T$-signal to be propagated towards the product by a propagating device, to receive a reflected signal resulting from a reflection of the transmit signal at a surface of the product, and to determine a fill level in the tank based on the received reflected signal; and
    measurement control circuitry configured to:
    at a measurement position above the fill level and a known distance from a reference position near a ceiling of the tank, determine a difference in signal amplitude between at least two consecutive fill level measurements; and
    if the determined difference in signal amplitude exceeds a predetermined threshold value, determine that a cleaning process is ongoing in the tank.

12. The radar level gauge according to claim 11, wherein the measurement control circuitry is further configured to:
    provide the transmit signal in the form of a frequency sweep signal; and
    sample the received reflected signal at predetermined intervals, wherein each sample corresponds to a unique distance from the reference position.

13. The radar level gauge according to claim 11, wherein the measurement control circuitry is further configured to:
    determine a relative difference in signal amplitude for a plurality of different samples of a frequency sweep signal;
    determine a median value of the determined differences in signal amplitude; and
    compare the median value with a predetermined threshold value, and if the median value exceeds the threshold value, determine that a cleaning process is ongoing in the tank.

14. The radar level gauge according to claim 11, wherein the control circuitry is further configured to, if it is detected that a cleaning process is ongoing in the tank, reduce a sensitivity of a fill level measurement during the cleaning process.

15. The radar level gauge according to claim 11, wherein the measurement control circuitry is further configured to, if it is detected that a cleaning process is ongoing in the tank, discard fill level measurements acquired during the cleaning process.

* * * * *